United States Patent [19]

DiRossi et al.

[11] Patent Number: 5,300,577

[45] Date of Patent: * Apr. 5, 1994

[54] RUBBER BLEND AND TIRE WITH TREAD THEREOF

[75] Inventors: Raymond R. DiRossi, Akron; Gregory M. Holtzapple, Kent; Joseph K. Hubbell, Akron; Mark H. Seloover, Clinton; John J. A. Verthe, Kent, all of Ohio

[73] Assignee: The Goodyear Tire & Rubber Company, Akron, Ohio

[ * ] Notice: The portion of the term of this patent subsequent to Feb. 11, 2009 has been disclaimed.

[21] Appl. No.: 832,113

[22] Filed: Feb. 6, 1992

Related U.S. Application Data

[63] Continuation-in-part of Ser. No. 698,007, May 9, 1991, Pat. No. 5,087,668, which is a continuation of Ser. No. 600,381, Oct. 19, 1990, abandoned.

[51] Int. Cl.$^5$ .......................... C08L 9/06; C08L 9/00; C08L 7/00; B60C 1/00
[52] U.S. Cl. ................................. 525/237; 152/209 R
[58] Field of Search ...................... 525/237; 152/209 R

[56] References Cited

U.S. PATENT DOCUMENTS

| | | | |
|---|---|---|---|
| 4,192,366 | 3/1980 | Scriver, Jr. et al. | 152/209 R |
| 4,383,085 | 5/1983 | Fujimaki et al. | 525/237 |
| 4,756,353 | 7/1988 | Nordsiek et al. | 525/232 |
| 4,824,900 | 4/1989 | Sakurai | 524/495 |
| 4,894,425 | 1/1990 | Hellermann et al. | 525/342 |
| 4,946,887 | 8/1990 | Takimo et al. | 525/237 |
| 5,047,483 | 9/1991 | Halasa et al. | 525/237 |
| 5,104,941 | 4/1992 | Wolpers et al. | 525/237 |

FOREIGN PATENT DOCUMENTS

| | | |
|---|---|---|
| 3720461 | 12/1988 | Fed. Rep. of Germany . |
| 58-196245 | 11/1983 | Japan . |
| 59-096143 | 6/1984 | Japan . |
| 59-210958 | 11/1984 | Japan . |
| 62-104847 | 5/1987 | Japan . |
| 01158056 | 12/1987 | Japan . |
| 63-004578 | 1/1988 | Japan . |

Primary Examiner—Carman J. Seccuro, Jr.
Attorney, Agent, or Firm—Henry C. Young, Jr.

[57] ABSTRACT

A pneumatic tire with a tread comprising a blend of 3,4-polyisoprene rubber, cis 1,4-polybutadiene rubber, and a terpolymer of styrene/isoprene/butadiene. The triblend of the three basic elastomers when compounded and cured into a polymer network gives a high tan delta at 0° C. associated with good wet traction and a low tan delta at 60° C. which has been associated with low rolling resistance.

12 Claims, No Drawings

RUBBER BLEND AND TIRE WITH TREAD THEREOF

CROSS REFERENCE

This application is a continuation-in-part application of U.S. application Ser. No. 07/698,007, filed May 9, 1991, having the title of Rubber Blend and Tire Tread Thereof, now U.S. Pat. No. 5,087,668, which was a continuation of U.S. application Ser. No. 07/600,381, filed Oct. 19, 1990 having the title of Rubber Blend and Tire Tread Thereof, now abandoned.

FIELD OF THE INVENTION

This invention relates to pneumatic tires with a tread composed of a blend of at least three polymers including 3,4-polyisoprene rubber, cis 1,4-polybutadiene, and a terpolymer of styrene/isoprene/butadiene.

BACKGROUND

Pneumatic rubber passenger and truck tires are composed of elements which conventionally include a tread of a rubber composition. The tread rubber is sometimes desirably compounded to provide a tire with a relatively low rolling resistance with reasonable wear and good traction.

Although it may be desired to compound the tire's tread composition to reduce the rolling resistance of the tire without substantially reducing the tire's traction features, tire traction might be expected to be somewhat sacrificed as may be evidenced by its decrease in wet and dry skid resistance.

Various rubber compositions have been prepared for various purposes, some of which have included the tire treads. Often tire treads are composed of synthetic rubber or blends of synthetic rubber with natural rubber for the purpose of achieving desirable tire tread characteristics such as wear, traction and reduction in rolling resistance. Various synthetic rubbers have been used in the manufacture of tires with such treads including styrene/butadiene copolymers (prepared by emulsion or solution polymerization methods) sometimes referred to as SBR, high cis 1,4 polybutadiene rubber as well as high and medium vinyl (1,2-) polybutadiene rubbers. Sometimes a synthetic cis 1,4-polyisoprene may, at least in part, be substituted for the natural rubber in tire tread compositions.

Vinyl isoprene (3,4-polyisoprene) rubber has heretofore been taught to be useful for various purposes such as, for example, as a blend with other rubber in tire treads and use in industrial products such as vibration dampers, belts and shoe soles.

Representative of various patent and patent application disclosures are JP (Japan) 79531(1982)(58-196,245); 84660(1983)(59-210,958); 206328(1982) (59-96,143); 1-158,056; 4578(1988); and 244786(1985) (62-104,847); GE (Germany) 3,720,461; U.S. Pat. Nos. 4,192,366; 4,756,353; 4,894,425; 4,946,887. One issued U.S. Pat. No. 5,047,483, discloses the use of SIBR terpolymer for use in tire tread compositions.

Viscoelastics properties of a rubber, or a rubber blend, for a tire tread applications, are important. For example, a tan delta property is the ratio of the viscous contribution to the elastic contribution for a viscoelastic rubber subjected to a dynamic deformation. Such property is typically represented in the form of a curve as a plot of tan delta values versus temperature.

For a tire with low rolling resistance, a tread rubber with tan delta optimization for a temperature in the range of about 50° C. to about 60° C. is desired and a tan delta optimization for a temperature range of about −20° C. to about +10° C. is desired for a tire with good wet skid resistance. It is difficult to adjust a rubber blend to achieve a tan delta optimization substantially simultaneously for both temperature ranges and, thus, for both rolling resistance and wet skid resistance at the same time. Often, compromises have to be made.

By tan delta optimization it is meant that the tan delta value for the rubber, or rubber blend, is maximized in the region of approximately −20° C. to about 10° C. for a tire tread to have high wet skid resistance and tan delta value is minimized in the region of about 60° C. for a tire tread to have low rolling resistance.

Although various rubber compositions are taught to provide various benefits, some for tire treads, it continues to be desirable to provide a pneumatic tire having a rubber tread having an enhanced rolling resistance and/or treadwear commensurate with reasonable traction qualities.

SUMMARY OF THE INVENTION

In accordance with this invention, a pneumatic tire is provided having an outer circumferential tread, where said tread is a sulfur cured rubber composition. The elastomers chosen in compounding this rubber composition have an effect on the performance of the tire. The rolling resistance of a tire has been correlated with a low tan delta at 60° C., while the wet traction of a tire is generally improved by compositions having a relatively higher tan delta at 0° C. Two different tread compositions showing improved tan delta values over standard tread compositions have been found.

One aspect of this invention disclosed first in the parent application is a tire tread composition composed of, based on 100 parts by weight rubber (phr); (A) about 5 to about 35 parts by weight 3,4-polyisoprene rubber; (B) about 20 to about 60 parts by weight cis 1,4-polyisoprene rubber; and (C) about 10 to about 50 parts by weight of at least one other diene containing rubber. This is discussed under the Detail Description.

The present invention relates to a pneumatic tire having an outer circumferential tread, where said tread composition is a sulfur cured rubber comprised of, based on 100 parts by weight rubber (phr); (A) about 5 to about 35 parts by weight 3,4-polyisoprene rubber; (B) about 5 to about 50 parts by weight high cis 1,4-polybutadiene rubber; (C) about 20 to about 90 parts by weight styrene/isoprene/butadiene copolymer; and (D) optionally 0 to about 25 parts by weight other additional diene based elastomers. Additional details specific to this invention are disclosed in Further Detailed Description of The Invention.

DETAILED DESCRIPTION OF THE INVENTION

In accordance with the prior embodiment of the invention, a pneumatic tire is provided having an outer circumferential tread where said tread is a sulfur cured rubber composition composed of, based on 100 parts by weight rubber (phr); (A) about 5 to about 35, preferably about 10 to about 25 parts by weight 3,4-polyisoprene rubber; (B) about 20 to about 60, preferably about 30 to about 55 parts by weight cis 1,4-polyisoprene rubber; and (C) about 10 to about 50 parts by weight of at least one other rubber selected from at least one of solution polymerization formed styrene/butadiene copolymer rubber having a styrene/butadiene ratio in the range of about 5/95 to about 30/70, preferably about 8/92 to about 25/75, emulsion polymerization formed styrene/butadiene copolymer rubber having a styrene/butadiene ratio in the range of about 10/90 to about 60/40, preferably about 15/85 to about 35/65, cis 1,4-polybutadiene rubber, isoprene/butadiene copolymer rubber having an isoprene/butadiene ratio in a range of about 30/70 to about 70/30, styrene/isoprene rubber having a styrene/isoprene ratio in a range of about 10/90 to about 35/65, and styrene/isoprene/butadiene rubber; wherein said 3,4-polyisoprene rubber, in its uncured state, is characterized by having a glass transition temperature (Tg) in the range of about −15° C. to about −20° C. a Mooney (ML1+4) value in the range of about 70 to about 90, preferably about 75 to about 85, and, further, a polymer structure containing about 40 to about 70 percent, preferably about 50 to about 60 percent, 3,4-vinyl isoprene units, about 30 to about 50 percent 1,4-cis and trans units and about 2 to about 10 percent 1,2-isoprene units with the total of its 3,4- and 1,2 units being in the range of about 56 to about 63 percent.

In further accordance with this invention, the rubber composition itself is contemplated.

The term "Tg" refers to the glass transition of the identified rubber and is suitably determined by a differential scanning calorimeter at a rate of 1° C. per minute.

Thus, the tread rubber is required to be a blend of at least three rubbers.

Preferably, the cis 1,4-polyisoprene rubber (B) is natural rubber.

Preferably, said other rubber (C) is selected from at least one of the solution polymerization prepared styrene/butadiene copolymer rubber and the isoprene/butadiene copolymer rubber.

In contemplated embodiments, such tread may be composed of, based on 100 parts by weight rubber, (A) a tri-rubber blend comprised of about 40 to 60 parts (by weight) natural rubber, about 30–40 parts styrene/butadiene copolymer rubber (preferably solution polymerization derived copolymer, sometimes referred to herein as S-SBR) and about 5–20 parts of 3,4-polyisoprene rubber as prescribed herein; (B) a quatra-rubber blend comprised of about 30 to 50 parts natural rubber, about 20 to 40 parts cis 1,4-polybutadiene rubber, about 10 to 30 parts isoprene/butadiene copolymer rubber and about 5 to 15 parts 3,4-polyisoprene rubber as prescribed herein; or (C) a quatra-rubber blend comprised of about 30 to 40 parts natural rubber, about 20 to 40 parts S-SBR, about 5 to 20 parts cis 1,4-polybutadiene rubber and about 10 to 20 parts 3,4-polyisoprene as prescribed herein.

It is an important feature of this invention that a specified 3,4-polyisoprene rubber is used with the prescribed characteristics, particularly its Tg and Mooney (ML1+4) viscosity limitations and, further, that the prescribed 3,4-polyisoprene is utilized as a minor component with selected other rubbers in a tire tread composition and that the 3,4-polyisoprene rubber is relatively incompatible with the other rubbers in the tread composition.

The Mooney (ML1+4) value in a range of about 70 to 90, preferably about 75 to about 85, for the 3,4-polyisoprene in combination with the required Tg range is considered to be important.

For processability of the 3,4-polyisoprene rubber it would ordinarily be desirable for the rubber to have a relatively low Mooney (ML1+4) value which is a measure of its viscosity and, on a relative basis, of its molecular weight.

However, for a purpose of achieving the desired low tan delta for the rubber blend in the region of 60° C., indicating a low hysteresis of the rubber blend and predicting a low rolling resistance for a tire with tread of such rubber blend as well as good abrasion resistance for the rubber blend in its compounded, sulfur cured condition, a higher molecular weight 3,4-polyisoprene polymer is required and, thus, one with the higher Mooney (ML1+4) value prescribed for the 3,4-polyisoprene rubber used in this invention.

Therefore, for the purpose of this invention, the relatively narrow Tg and Mooney (ML1+4) ranges of values are prescribed in combination with the specified 3,4-, 1,2- and 1,4-contents, including the relatively narrowly defined total of 3,4- and 1,2-units being from 56 to 63 percent.

The ML(1+4) is a measure or value well known to those skilled in such art and typically determined by a Mooney Disk Viscometer.

It is to be appreciated that the 3,4-polyisoprene rubber for this invention is required to have the aforesaid characteristics for preparing a tire tread to enable a tire to have good treadwear and low rolling resistance. Therefore, the rubber is required to have a relatively high molecular weight, or Mooney (ML1+4) value while still possessing a reasonably good processability. The good processability of the rubber is a desirable feature so long as the aforesaid good rolling resistance and treadwear of the tire is not appreciably compromised.

It is preferred that the 3,4-polyisoprene, by having the defined physical Tg characteristic, is relatively incompatible in the rubber tread blend. By being incompatible, it is meant that the 3,4-polyisoprene rubber individually displays a second, or additional, tan delta hump, or upward bend of the curve, in addition to the tan delta peak for the diene rubbers (B) and (C), which appears when the 3,4-polyisoprene is blended with rubbers (B) and (C), as evidenced by the viscoelastic response of the cured blend to a dynamic deformation.

Three sulfur cured rubber blends of 3,4-polyisoprene rubber and natural rubber, identified as experimental blend (A) experimental blend (B) and experimental blend (C) with the Tg's of the 3,4-polyisoprene being −18° C., −11° C., and −25° C. respectively are referenced in the following table. Each blend was a sulfur cured compounded blend composed of 25 parts by weight 3,4-polyisoprene, and 75 parts by weight natural rubber.

| Rubber Blends | |
|---|---|
| Blend Identification | Tg of 3,4-polyisoprene |
| 1. Experimental (A) | −18° C. |
| 2. Experimental (B) | −11° C. |
| 3. Experimental (C) | −25° C. |

The tan delta maximization in the range of −20° C. to +10° C. coupled with a minimization in the 60° C. region for the dual rubber blend is accomplished with a 3,4-polyisoprene having a Tg of −18° C., thus, indicating that the 3,4-polyisoprene with a Tg of about −18°

C. is the preferable rubber for the purposes of the tri-rubber and quatra-rubber blends of this invention.

Only compound (A) demonstrated optimized tan delta curves for both the 60° C. and the −20° C. to 10° C. ranges, thus, indicating the desirability of utilizing the 3,4-polyisoprene with a Tg of about −18° C.

Three pneumatic rubber tires having treads composed of individual sulfur cured compounded blends of the 3,4-polyisoprene rubbers having Tg's of −11° C., −18° C. and −25° C. plus cis 1,4-polyisoprene rubber (natural rubber) in a 25/75 ratio were prepared and tested for wet traction, or skid resistance, (20 mph) and for rolling resistance. The results are shown in the following table and compared with a control tire with a tread composed of a sulfur cured compounded blend of natural rubber and S-SBR in a 50/50 ratio:

| Properties | TIRE PROPERTIES | | | |
|---|---|---|---|---|
| | Control Tire | Experimental Tires | | |
| Tg of 3,4-Polyisoprene | | −11° C. | −18° C. | −25° C. |
| Rolling Resistance[1] | 100 | 102 | 106 | 110 |
| Wet Traction | 100 | 108 | 104 | 101 |
| Treadwear[2] | 100 | — | 80 | — |

[1]An increase of the normalized value reflects a reduction in rolling resistance which is considered an improvement.
[2]Data not taken for treadwear for −11° C. and −25° C. Tg 3,4 polyisoprene containing tire treads.

The values for the tire properties for the control tire were normalized to a value of 100 and the properties of the experimental tire were compared to the control tire's values.

While the dual rubber blend, utilizing the 3,4-polyisoprene with a Tg of −18° C., demonstrated enhanced properties as shown in the preceding table, it also demonstrated certain disadvantages for use as a tire tread, namely, upon tire test with a tread composed of such a dual rubber blend, an inadequate treadwear was observed.

Consequently, a tri-blend of rubbers was prepared and sulfur cured. The results show that a similar and desirable tan delta is obtained with suitable maximum and minimum values if the 3,4-polyisoprene having a Tg of −18° C. is used. Subsequent tire tests with such a tri-rubber blend for its tread yielded a tire with adequate treadwear.

Blend Y was a sulfur cured blend of 55 parts by weight cis 1,4-polyisoprene natural rubber, 30 parts by weight solution polymerization prepared styrene/butadiene rubber with about 10 percent styrene, and 15 parts by weight 3,4-polyisoprene rubber required by this invention and having a Tg of −18° C. Control blend X was 50 parts by weight cis 1,4-polyisoprene natural rubber and 50 parts solution polymerization prepared styrene/butadiene copolymer rubber containing about 10 percent styrene.

The tri-blend sulfur cured rubber composition has a higher tan delta maximization in the range of −20° C. to +10° C. and a minimization in the range of about 50° C. to about 60° C. A second tan delta hump in the region of about −20° C. to about +10° C. indicates that the 3,4-polyisoprene is substantially incompatible with the remaining rubbers of the blend. The departure of the curve in the −20° C. to +10° C. region from a smooth curve to a curve containing an upward bend demonstrates the relative incompatibility.

For some applications, it has further been found to be practical to utilize a pneumatic rubber tire with a quatra-rubber blend for its tread to more completely optimize rolling resistance, traction and treadwear including winter tire performance.

While the contribution of various elements or components of a composition are not always completely understood, it is considered that an important and significant component of the blend is the specified 3,4-polyisoprene with its Tg of about −18° C. together with its Mooney viscosity limitation properties which apparently provides unique viscoelastic properties when combined with the remainder of the rubbers (B) and (C), particularly as compounded sulfur cured tri-rubber and quatra-rubber blends for tire treads.

The samples of the sulfur cured rubber blends were tested by Rheometrics Viscometer System IV dynamic viscoelastic tester, obtained from the Rheometrics Company, to determine the relationship between tan delta and temperature from −80° C. to +25° C. During the test, the samples are maintained under tension (0.5% strain) and a cyclic deformation is applied to the sample at a frequency rate of one hertz. The viscoelastic tester measures the response of the sample to the applied deformation and calculates the tan delta values at the desired temperatures.

The samples of sulfur cured rubber blends were also tested by a Rheovibron dynamic viscoelastic tester, an instrument provided by Imass, Inc., to determine their tan deltas at 60° C.

Samples of cured rubber blends were tested for. by an Autovibron automated dynamic viscoelastic tester, an instrument provided by Imass, Inc., to determine the relationship of tan delta versus temperature from −60° C. to +60° C. for the indicated rubber blend containing the 3,4-polyisoprene rubber with the Tg of −18° C. A tension (strain) of 0.1% and frequency of 11 hertz was used.

The objective for these tests is to measure the viscoelastic response to an applied deformation of a cured rubber sample under tension at a specified strain, frequency and temperature, or temperature range. The viscoelastic response is used by the instrument to determine the storage modulus, E', which is a measure of energy stored and recovered in cyclic deformation, and the loss modulus, E", which is a measure of energy dissipated as heat. The ratio of E"/E' is the tan delta for a particular temperature.

Thus, in effect, the tan delta is a measure of a compound's viscoelastic character and has been observed to relate to tire tread performance. The tan delta versus temperature characterization of rubbers is well known to those having skill in such art.

As pointed out, in practice it has been observed that, for pneumatic rubber tires, a high tan delta in the region of −20° C. to +10° C. is desirable for a tire tread to provide a tire with good wet traction while a low tan delta in the region of 50° C. to 60° C. is desirable for a tire tread to provide a tire with good rolling resistance.

The experimental tread rubber (A) exhibits a high tan delta in the region of −20° C. to +10° C., thus, predictably suitable for providing a tire with good wet traction and a low tan delta in the region of 60° C., thus, predictably suitable for a tire with good rolling resistance for this rubber blend.

The importance of such phenomenon is that the rubber blend of this invention enables a relative optimization of the property of tan delta for prescribed temperatures while also maintaining or even optimizing the property of a tire's rolling resistance and wet skid resistance.

Conversely, the rubber (B) for the 3,4-polyisoprene having a Tg of −11° C. shows a higher tan delta in the −20° C. to +10° C. range, thus, predicting a tread with better traction than (A) and a tan delta in the 60° C. range being higher than curve (A) predicting higher tire rolling resistance, as compared to curve (A), for this rubber blend.

Also conversely, (C) for a 3,4-polyisoprene with Tg of −25° C. shows a lower tan delta in the 60° C. temperature range but a lower tan delta at the −20° C. to +10° C. predicting a lower tire rolling resistance with lower wet tread traction for this rubber blend.

The advantages of such dual optimization are several fold, particularly including rolling resistance and skid resistance.

In the description of this invention, while the cis 1,4-polyisoprene rubber includes both natural and synthetic rubber, as pointed out, the natural rubber is preferred. The cis 1,4-polyisoprene rubber, natural or synthetic, typically has a cis 1,4-content of about 96 to about 99 weight percent.

The polybutadiene rubber can be composed of about 95 percent or more of cis 1,4-structure when prepared with Ziegler-type catalyst or can be composed of at least about 90 percent cis and trans 1,4 structure when prepared with alkyl lithium catalyst. Such polybutadiene rubbers are well known.

The terms butadiene and polybutadiene as used herein refer to 1,3-butadiene and polymers derived from 1,3-butadiene, respectively.

The solution polymerization prepared styrene/-butadiene copolymer rubber (S-SBR) can be prepared by copolymerizing styrene and butadiene in an organic solvent in the presence of a suitable catalyst. It typically has a substantially narrower average molecular weight distribution than an emulsion polymerization prepared styrene/butadiene copolymer rubber (E-SBR) and, further, typically enhances or improves a tire's treadwear and rolling resistance when used as a rubber component of a tire tread.

The emulsion polymerization prepared styrene/-butadiene rubber is prepared as an emulsion polymerization and sometimes referred to herein as E-SBR.

Both the S-SBR and E-SBR are well known rubbers as is their differences in molecular weight distributions.

As an embodiment of the invention, particularly for tires to be used for somewhat conventional loads and speeds such as passenger vehicle tires, although the embodiment is not necessarily limited to such use, is a pneumatic tire provided with such tread where said tread is a sulfur cured rubber composition comprised of, based on 100 parts by weight rubber, (A) about 10 to about 25 phr of the 3,4-polyisoprene; (B) about 40 to about 55 phr of said natural rubber; and (C) about 10 to about 50 phr of at least one of isoprene/butadiene copolymer rubber and styrene/butadiene rubber, preferably solution polymerization prepared styrene/butadiene rubber, and cis 1,4-polybutadiene rubber and styrene/isoprene/butadiene terpolymer rubber.

Other exemplary embodiments can be such tire with tread composed of rubber blend embodiments hereinbefore exemplified.

Such pneumatic tires are conventionally comprised of a generally toroidal shaped carcass with an outer circumferential tread, adapted to be ground contacting, spaced beads and sidewalls extending radially from and connecting said tread to said beads.

The required 3,4-polyisoprene rubber for the rubber components of this invention can suitably be prepared by polymerizing isoprene, preferably on a continuous reactor basis in the presence of an organo lithium catalyst, such as butyl lithium, in an organic solvent, such as, for example, hexane, and a polar modifier, such as tetramethylethylene diamine (TMEDA) and the polymerization shortstoppe with triisopropanol amine, rosin acid, methanol or other suitable shortstop to obtain the required Tg.

The amount of organo lithium catalyst is largely dependent upon the molecular weight desired for the resultant polymer.

As hereinbefore represented in the accompanying drawing, several 3,4-polyisoprene rubber polymers were prepared with various polymer configurations (Tg's, etc.) and blended with various other rubbers in order to achieve the present invention. Accordingly, it was considered that the 3,4-polyisoprene rubber have a Tg in the range of about −15° C. to about −20° C. in order to provide a micro structure for the tire tread for wet traction; a Mooney (ML1+4) value in the range of about 70 to about 90, preferably about 75 to about 85 in order to contribute to lower heat generation for the tread tri-rubber blend or quatra-rubber blend and, thus, lower rolling resistance; a 3,4-content in the range of about 50 to about 60 in order to provide microstructure for polymer incompatibility with other rubbers in the blend and, thus, improve wet traction for the tire tread; a 1,2-content in the range of about 2 to about 10 in order to also assist in providing microstructure for the tire tread's wet traction and a sum of the 3,4 and 1,2 (vinyl) contents in the range of about 56 to about 63 in order to aid in providing an incompatibility factor for the (B) and (C) rubbers in the tire tread to enhance its wet traction.

The prescribed 3,4-polyisoprene rubber is used in a minor amount (less than about 35 phr) of the rubber composition for the tread. Its primary contribution relates to enhancing traction, particularly wet traction for the tread. Larger amounts of the rubber would be expected, or has been observed, to increase rolling resistance and decrease tear resistance of the tire tread.

The other rubbers are utilized as the major portion of the tread rubber because the natural rubber contributes to low rolling resistance and treadwear and the third and fourth rubber(s) of the tri-blend and quatra-blend generally contribute(s) to wet traction and treadwear.

While the rubbers used herein, particularly those in the higher Mooney (ML1+4) viscosity range, can optionally be individually oil extended before or during mixing with various rubber compounding materials for ease of processing; it is preferred in the practice (in this prior embodiment) of this invention that oil extension is not used. If oil extension is used, usually about 10 to about 50 phr of rubber processing oil is used, usually of the aromatic or aromatic/napthenic oil type or paraffinic/napthenic oil type.

It should readily be understood by one having skill in the art that said tread portion of the pneumatic tire as well as the rubber or other material in the basic carcass, which normally contains reinforcing elements in the tread region, can be compounded by methods generally known in the rubber compounding art, such as mixing the various sulfur-vulcanizable constituent rubbers with various commonly used additive materials such, as for example, curing aids, such as sulfur, activators, retarders and accelerators, processing additives, such as oils, resins including tackifying resins, silicas, and plasticizers, fillers, pigments, stearic acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the certain additives mentioned above are selected and commonly used in conventional amounts.

Typical additions of carbon black comprise about 20 to 100 parts by weight of diene rubber (phr), preferably 30 to 60 phr. Typical amounts of tackifier resins, if used, comprise about 0.5 to 10 phr. Typical amounts of processing aids comprise 1 to 5 phr. Typical amounts of silica, if used, comprise about 5 to about 25 phr and amounts of silica coupler, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl)tetrasulfide and bis(3-trimethoxy-silylpropyl)tetrasulfide grafted silica from DeGussa, AG. Typical amounts of antioxidants comprise 1 to about 5 phr. Representative antioxidants may be, for example, diphenyl-p-phenylenediamine and others, such as those disclosed in the *Vanderbilt Rubber Handbook* (1978), pages 344-346. Suitable antiozonant(s) and waxes, particular microcrystalline waxes, may be of the type shown in the *Vanderbilt Rubber Handbook* (1978), pages 346-347. Typical amounts of antiozonants comprise 1 to about 5 phr. Typical amounts of stearic acid comprise 1 to about 3 phr. Typical amounts of zinc oxide comprise 2 to 5 phr. Typical amounts of waxes comprise 1 to 5 phr. Typical amounts of peptizers comprise 0.1 to 1 phr. The presence and relative amounts of the above additives are not an aspect of the present invention which is primarily directed to the utilization of specified blends of rubbers in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to 2.0 phr. In another embodiment, combinations of two or more accelerators which is generally used in the larger amount (0.5 to 1.0 phr), and a secondary accelerator which is generally used in smaller amounts (0.05-0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less effected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in the art.

In the practice of this invention, the polymer blend-tread can be integral with and adhered to various tire carcass substrate rubber compositions. Typically, such a rubber composition is at least one of a butadiene/styrene copolymer rubber, cis 1,4-polyisoprene (natural or synthetic rubber) and 1,4 polybutadiene. Optionally, such a blend for a portion of the tread, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubber.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

As previously discussed, an important contribution of the prescribed 3,4-polyisoprene rubber for the tire tread component is attributed to the increase of wet skid resistance for the tread tri-blend or quatra-blend with minimal increase in rolling resistance due to its relatively high molecular weight as evidenced by its relatively high Mooney (ML1+4) value. A contribution of the natural rubber for the tire tread component is attributed to a lower rolling resistance and to treadwear and to an improved tear resistance. A contribution of the additional diene rubber is attributed to some of the traction, treadwear and/or rolling resistance for the tire.

The practice of this invention is further illustrated by reference to the following examples which are intended to be representative rather than restrictive of the scope of the invention. Unless otherwise indicated, all parts and percentages are by weight.

EXAMPLE I

Pneumatic tires of conventional construction (grooved tread, sidewalls, spaced beads, and supporting fabric-reinforced carcass) were built, shaped and cured in a conventional tire mold. The tread was built onto the uncured carcass as a pre-extruded element. The tires were of the P195/75R14 type which indicates that they were belted, radial ply passenger type tires.

One tire is identified herein as Control X and an experimental tire identified as Experimental Y.

Control tire X had a tread composed of (A) 50 phr butadiene/styrene rubber; and (B) 50 phr natural rubber and is intended to represent a somewhat conventional passenger tire tread.

Experimental tire Y had a tread composed of (A) 3,4-polyisoprene rubber prescribed herein and having a Tg of about −18° C., and a vinyl 3,4-content of about 55 percent; (B) natural rubber; and (C) S-SBR.

Thus, the 3,4-polyisoprene rubber, basically, replaced at least a part of the butadiene/styrene rubber in the tread rubber blend.

The tires (X and Y) were mounted on rims, inflated and submitted to testing. The test values for the control were normalized to a value of 100 for comparison purposes. The tire with the experimental tread was tested and its test values compared to the values of the control tire and reported relative to the normalized values of 100.

The tire with the experimental tread rubber composition Y exhibited a lower rolling resistance and higher skid resistance while providing a similar treadwear as compared to control tire X. These results are considered to be an important departure from results which might ordinarily be expected absent the prior experimentation reported herein.

The tread compositions for tires X and Y were comprised of materials shown in the following Table 1.

TABLE 1

| Rubber Compound | Control (X) | parts[1] Experimental (Y) |
|---|---|---|
| Butadiene/styrene rubber[2] | 50 | 30 |
| Natural rubber | 50 | 55 |
| 3,4-polyisoprene rubber[3] | 0 | 15 |
| Oil, paraffinic/napthenic | 7 | 4 |
| Carbon black (GPT) | 43 | 38 |

[1]Amounts rounded to nearest part.
[2]Solution polymerization prepared SBR obtained as SLF 1216 from The Goodyear Tire & Rubber Company.
[3]Polymer is composed of about 55 percent 3,4 units, about 5 percent 1,2-units and about 40 percent 1,4-units and is the 3,4-polyisoprene described in this specification, particularly of the type shown in Experiment A of TABLE 2 herein. It had a Tg of −18° C.

The rubber compound contained conventional amounts of antioxidant, antiozonant, stearic acid, peptizer, wax, silica and coupling agent, sulfur, accelerator(s) and zinc oxide which are not considered as being the aspect of this invention since the invention is primarily directed to the rubber blend itself.

Table 2 illustrates various characteristics of the 3,4-polyisoprene rubber used in this invention, particularly for Experimental tire Y herein.

TABLE 2

| Product Analysis | Experiment A |
|---|---|
| Molecular Weight (Number Average) | 250,000 |
| Molecular Weight (Weight Average) | 450,000 |
| Glass Transition Temperature | −18° C. |
| Mooney Viscosity (ML1 + 4 at 100° C.) | 80 |

Table 3 illustrates various characteristics of the (Control X) and (Experimental Y) rubber compound.

TABLE 3

| Property | Control X | Exp Y |
|---|---|---|
| 300% Modulus (MN/m²) | 10.5 | 10 |
| Tensile (MN/m²) | 19.2 | 18 |
| Elongation (%) | 510 | 500 |
| Rebound (23° C.) | 46 | 50 |
| Rebound (100° C.) | 64.3 | 67 |

TABLE 3-continued

| Property | Control X | Exp Y |
|---|---|---|
| Autovibron | | |
| Tan Delta (0° C.) | 0.135 | 0.209 |
| Tan Delta (60° C.) | 0.093 | 0.083 |

Table 4 illustrates the rolling resistance, wet skid resistance and treadwear values with the Experimental Tire Y compared to values of Control Tire X normalized to 100.

TABLE 4

| Measured Values | Control X | Experimental Y[1,2] |
|---|---|---|
| Rolling resistance (67" wheel) | 100 | 109 (Improved) |
| Wet skid resistance (20 mph) | 100 | 108 (Improved) |
| Treadwear | 100 | 100 |

[1]a reduction in the Rolling Resistance is represented by an increase in the relative reported value and is considered an improvement.
[2]an increase in the Treadwear value is an improvement.

The rolling resistance was measured by mounting and inflating the tire on a metal rim and allowing it to be turned by a 67 inch diameter dynamometer under about 80 percent of its rated load at a rate equivalent to a vehicular speed of 50 mph and the drag force measured. The test is believed to be somewhat standard.

The skid resistance was a standard test in which the tires are mounted on a weighted, drawn trailer at various speeds and brakes of the trailer applied and skid force (peak and slide) measured.

The treadwear was evaluated as a measure of reduction in tread depth after about 20,000 kilometers of test on an automobile.

The treadwear was compared by actually mounting both control and experimental tires on a vehicle and driving it under controlled conditions, (38 psig inflation) with the position of the tires on the vehicle being maintained while rotated through vehicles.

In this Example, the 3,4-polyisoprene is prepared as hereinbefore reported with hexane as a solvent.

FURTHER DETAILED DESCRIPTION OF THE INVENTION

In addition to the previously disclosed tread compositions, another group of compositions has been found giving unexpected properties that should result in improved traction and low rolling resistance. The 3,4-polyisoprene having a Tg in the range of −15° C. to −20° C. used to optimize both traction and rolling resistance in the previous composition was used in combination with high cis 1,4-polybutadiene and SIBR rubbers. This composition showed high tan delta in the −20° to 10° C. range previously associated with good traction and low tan delta at a 60° C. temperature associated with low rolling resistance.

In accordance with this invention, a pneumatic tire is provided having an outer circumferential tread where said tread is a sulfur cured rubber composition comprising of, (A) about 5 to about 35, preferably about 5 to about 25 parts by weight 3,4-polyisoprene rubber; (B) about 5 to about 50 parts by weight, preferably about 10 to about 40 parts by weight cis 1,4-polybutadiene rubber; and (C) about 20 to about 90 parts, preferably about 50 to about 80 parts by weight styrene/isoprene/butadiene; terpolymer (D) optionally about 0 to about 25 parts, based on 100 parts of (A, B, and C), and preferably about 0 to about 20 parts of other diene based rubbers such as cis 1,4-poly-isoprene, solution polymerized poly(styrene-butadiene), emulsion polymerized poly(styrene-butadiene), medium vinyl polybutadiene, or emulsion polymerized polybutadiene. In further accordance with this invention, the rubber composition itself is contemplated.

Said 3,4-polyisoprene rubber, in its uncured state, is characterized by having a glass transition temperature (Tg) in the range of about $-15°$ C. to about $-20°$ C. a Mooney (ML1+4) value in the range of about 70 to about 90, preferably about 75 to about 85, and, further, a polymer structure containing about 40 to about 70 percent, preferably about 50 to about 60 percent, 3,4-vinyl isoprene units, about 28 to about 50 percent 1,4-cis and trans units and about 2 to about 10 percent 1,2-isoprene units with the total of its 3,4- and 1,2-units being in the range of about 56 to about 63 percent. Other aspects of the 3,4-polyisoprene rubber have been set forth above and hence is incorporated by reference, rather than repeated.

Said SIBR rubber is comprised of (A) of about 5 to about 70 weight percent and desirably about 10 to about 40 weight percent bound styrene (B) about 20 to about 70 weight percent and desirably about 30 to about 60 weight percent bound isoprene and (C) about 10 to about 60 weight percent and desirably about 20 to about 45 weight percent bound butadiene and is characterized by having a glass transition temperature (Tg) in the range of about $-70°$ C. to about $-5°$ C. and, further, the said bound butadiene structure contains about 10 to about 50 weight percent and desirably about 30 to about 40 weight percent 1,2-vinyl units, the said bound isoprene structure contains about 10 to about 40 weight percent and desirably from about 10 to about 30 weight percent 3,4 units, and the sum of the weight percent 1,2-vinyl units of the bound butadiene and the weight percent 3,4 units of the bound isoprene is in the range of about 20 to about 90 percent and desirably about 40 to about 70 percent.

Such a copolymer is disclosed in commonly owned U.S. patent Ser. No. 5,047,483 filed on Jun. 29, 1988 titled Pneumatic Tire with Tread of Styrene, Isoprene, Butadiene Rubber, which is hereby fully incorporated by reference. Three different SIBR compositions were separately disclosed in U.S. Ser. No. 5,047,483 showing the general range of copolymers produced.

In further accordance with this invention, one of such a SIBR is provided having a Tg in the range of about $-10°$ C. to about $-40°$ C. characterized in that its bound styrene content is in the range of about 30 to about 60 weight percent, and the sum of the weight percent 1,2 vinyl units of the bound butadiene and the weight percent 3,4 units of the bound isoprene is in the range of about 20 to about 45.

In further accordance with this invention, another of such a SIBR is provided having a Tg in the range of about $-10°$ C. to about $-40°$ C. characterized in that its bound styrene content is in the range of about 10 to about 30 weight percent, and the sum of the weight percent 1,2 vinyl units of the bound butadiene and the weight percent 3,4 units of the bound isoprene is in the range of about 45 to about 90.

In further accordance with this invention, still another such a SIBR is provided having a Tg in the range of about $-50°$ C. to about $-70°$ C. characterized in that its bound styrene is in the range of about 10 to about 30 weight percent, and the sum of the weight percent 1,2 vinyl units of the bound butadiene and the weight percent 3,4 units of the bound isoprene is in the range of about 20 to about 45.

A desired SIBR for this invention has a Tg in the range of about $-20°$ C. to $-55°$ C. with a preferred range of about $-30°$ C. to about $-50°$ C. This copolymer has a styrene content in the range of 10 to about 30 weight percent, and the sum of the weight percent 1,2 vinyl units of the bound butadiene and the weight percent 3,4 units of the bound isoprene is in the range of about 20 to about 90, and preferably about 40 to about 70.

The terms bound styrene, bound butadiene and bound isoprene refer to the structure of such materials when they have been terpolymerized to form the SIBR terpolymer.

The percent 1,2 vinyl units of the bound butadiene is based on the bound butadiene itself and the percent 3,4 units of the bound isoprene is based on the bound isoprene itself and the sum thereof is in the sum of such percentages.

The term "Tg" refers to the glass transition of the identified rubber and is suitably determined by a differential scanning calorimeter at a rate of 1° C. per minute.

The cis 1,4-polybutadiene rubber can be composed of about 95 percent or more of cis 1,4-structure when prepared with Ziegler-type catalyst or can be composed at least about 90 percent cis and trans 1,4 structure when prepared with alkyl lithium catalyst. Both types of rubber are well known to the art as well as to the literature.

Considering the various optional diene based rubbers, the medium vinyl polybutadiene can be conveniently prepared by polymerizing 1,3-butadiene in an organic solvent with an organolithium compound as a catalyst with the addition of at least one polar modifier to enhance and increase its vinyl content. Generally, the temperature of the reaction can be in the range of about 30° C. to about 150° C. For further details concerning preparation of such a medium vinyl polybutadiene, reference can be made to U.S. Pat. No. 3,937,681 and to the patent references referred to therein.

The medium vinyl polybutadiene can be additionally described as containing about 30 to about 55 percent monomer units in the 1,2-position, about 10 to about 40 percent monomer units of cis 1,4-carbon-to-carbon double bonds and about 15 to about 55 percent monomer units of trans-1,4 carbon-to-carbon double bonds and having a ML-4(100° C.) viscosity in the range of about 40 to about 120.

Said solution polymerized poly(styrenebutadiene) and emulsion polymerized (styrene-butadiene), are further described in the Detailed Description section of this document. The emulsion polymerized polybutadiene is a typical polybutadiene made by emulsion polymerization.

In the description of this invention, the cis 1,4-polyisoprene rubber includes both natural and synthetic rubber. Often, the natural rubber is preferred. The cis 1,4-polyisoprene rubber, natural or synthetic, typically has a cis 1,4-content of about 96 to about 99 weight percent.

While the precise chemical nature of SIBR rubber is not totally understood at this time, it has been observed that its inclusion in the elastomeric compound of a tread provides enhanced characteristics of a tread provides enhanced characteristics such as a desirable combination of rolling resistance, skid resistance, and treadwear. One especially advantageous feature of treads containing SIBR is that chosen characteristics of the material can be accentuated depending on the desires of a vehicle manufacturer or other user of the tire.

The terpolymer of styrene/isoprene/butadiene (SIBR) is prepared by polymerizing styrene, isoprene, and 1,3-butadiene in an essentially non-polar aliphatic solvent with an alkyl lithium catalyst, usually butyl lithium with or without a modifier. When a polar modifier is used for randomizing or tapering the styrene such as, for example, chelating diamines or polar ether and oxygenated compounds, the amount of polar modifiers used depends largely on the desired Tg, glass transition temperature. If a high Tg SIBR ($-10°$ C. to $-20°$ C.) is desired, the modifier used can be TMEDA (N,N,N$^1$,N$^1$-tetra methyl ethylene diamine) or diglyme. If no modifier is used, the polymerization temperature can be adjusted to randomize the styrene or taper it. The SIBR randomization without the polar modifier, is conventionally made at polymerization temperatures of 90° C. to about 150° C. With modifier present, the polymerization temperature can be from about 10° C. to about 120° C.

The resulting SIBR polymer (rubber) can be further characterized by its glass transition temperature based on the 1,2 bound butadiene plus styrene (formed when a modifier is used in the polymerization) in weight percent or 3,4 bound isoprene plus styrene content or both 1,2 bound butadiene and 3,4 bound isoprene plus styrene content.

High Tg SIBR polymer can have a low styrene content with high 3,4 bound isoprene content (from the isoprene component) and 1,2 bound butadiene (from the butadiene component) or high styrene with low 3,4 bound isoprene (in the isoprene component) and 1,2 bound butadiene (in the butadiene component) depending on the desired properties needed to be maximized.

Thus, if a relatively low Tg SIBR is desired, a high styrene content is the primary consideration. If a relatively high Tg SIBR is desired, at a constant or given styrene content, the primary consideration is for a high concentration of the sum of the 1,2-structure of the bound butadiene units plus the 3,4-structure of the bound isoprene units.

The rubbers used herein, particularly those in the higher (ML 1+4) Mooney viscosity range can optionally be individually oil extended before or during mixing with various rubber compounding materials for ease of processing. If oil extension is used, usually about 10 to about 50 phr of rubber processing oil is used, usually of the aromatic or naphthenic oil type, to provide a (ML 1+4) (100° C.) viscosity of about 40 to about 100, preferably about 60 to about 90, for the uncured rubber composition. In the prior embodiment of this invention disclosed in the Detailed Description, the use of oil extension was not preferred. In this embodiment, the use of oil extension is preferred.

Further details on polymerizing 3,4-polyisoprene are given in the Detailed Description of the prior embodiment. Further details on the molecular structure, Mooney (ML 1+4) values, and optimal Tg value for the 3,4-polyisoprene from the Detailed Description of the prior embodiment are also applicable to this invention of the 3,4-polyisoprene, cis 1,4 polybutadiene, and SIBR blend. In the interest of brevity, they will not be repeated here.

A 3,4-polyisoprene having a Tg of approximately $-15$ to $-20°$ C. that was found effective to maximize the tan delta value in the temperature range of $-20°$ C. to $-10°$ C. while able to minimize the tan delta in the temperature of 60° C. was also formulated in the present invention along with high cis 1,4-polybutadiene and a styrene/isoprene/butadiene copolymer.

The styrene/isoprene/butadiene copolymer used was similar to SIBR I in Table 1 of U.S. Pat. No. 5,047,483 assigned to The Goodyear Tire and Rubber Company. In Table 1 and Table 4 of that patent, the experimental tire made with this (SIBR) copolymer showed an improvement in rolling resistance and in treadwear over a control which was based on 50 parts by weight natural rubber and 50 parts by weight emulsion polymerized styrene butadiene rubber.

In the prior embodiment, the use of oil extension was not preferred. In this embodiment, using 3,4-polyisoprene, cis 1,4-polybutadiene and SIBR copolymer the use of oil extension using aromatic or naphthenic oils is preferred.

It was found that using these three polymers in optimized proportions could yield a tread compound having optimal tan delta responses in selected regions. These tan delta responses had previously in the Detailed Description been correlated with reduced rolling resistance and enhanced wet traction.

The practice of this invention is further illustrated by reference to the following examples which are intended as illustrative rather than restrictive of the scope of the invention. Unless otherwise indicated, all parts and percentages are by weight.

EXAMPLE II

Comparative Example (Control)

A tread rubber composition was formulated to represent a conventional tire-tread composition using solution styrene-butadiene polymer and high cis 1,4-polybutadiene as the base polymers using the recipe shown in Table 5.

EXAMPLE III

Experimental Compound A

A tread rubber composition was formulated to represent the polymer blend of this invention using 15 parts of a 3,4-polyisoprene rubber as described in this disclosure, 15 parts high cis 1,4-polybutadiene, and 70 parts of a styrene/isoprene/butadiene copolymer (SIBR) rubber as described in this disclosure.

EXAMPLE IV

Experimental Compound B

A tread rubber composition was formulated to represent the polymer blend of this invention using 20 parts of 3,4-polyisoprene rubber, 25 parts high cis 1,4-polybutadiene, and 55 parts of a styrene/isoprene/butadiene copolymer.

TABLE 5

| | CONTROL | EXPTL-A | EXPTL-B |
|---|---|---|---|
| Rubber | | | |
| S-SBR (10% Styrene) | 65 | | |
| 3,4 Polyisoprene | | 15 | 20 |
| PBD (High Cis) | 35 | 15 | 25 |
| SIBR (20/40/40) | | 70 | 55 |
| Compounding Components | | | |
| ISAF Carbon Black | 70 | 50 | 50 |
| Oil (naphthenic) | 40.25 | 29 | 33.75 |
| Sulfur | 1.2 | 1.2 | 1.2 |
| Accelerator (TMTD/Thiazole) | 2.2 | 2.2 | 2.2 |

TABLE 5-continued

|  | CONTROL | EXPTL-A | EXPTL-B |
|---|---|---|---|
| P-Phenylene Diamine Andiox | 3.0 | 3.0 | 3.0 |
| Paraffinic Wax | 0.5 | 0.5 | 0.5 |
| Micro Crystalline Wax | 2.0 | 2.0 | 2.0 |
| Stearic Acid | 2.0 | 2.0 | 2.0 |
| Zinc Oxide | 4.0 | 4.0 | 4.0 |
| Physical Properties | | | |
| 300% Modulus (MPa) | 9.67 | 9.08 | 6.44 |
| Tensile (MPa) | 14.62 | 9.90 | 8.23 |
| Elongation | 449. | 347. | 332. |
| Rebound (23° C.) DIN 53512 | 36.3 | 44.0 | 46.1 |
| Rebound (100° C.) DIN 53512 | 56.4 | 69.0 | 69.5 |
| Autovibron | | | |
| Tan Delta (0° C.) | .102 | .188 | .194 |
| Tan Delta (60° C.) | .093 | .070 | .065 |

The solution styrene-butadiene polymer (SSBR) used in the above experiment was 10 weight percent styrene and had Mooney Viscosity (ML 1+4) of 90. The high cis polybutadiene had a Mooney Viscosity (ML 1+4) of 55. The SIBR copolymer was about 20 weight percent styrene, 40 weight percent isoprene, and 40 weight percent butadiene having a Tg of −42° C. and a Mooney Viscosity of 90. The 3,4-polyiosprene had a Tg of −16° C. and a Mooney viscosity of 80.

The rebound test (DIN 53512) in Table 5 at 23° C. and 100° C. shows that the two experimental samples were more resilient than the control samples at these temperatures. A high rebound value means low hysteresis which is desirable for low rolling resistance. The Autovibron test measures the tan delta of the polymer at various temperatures. The tan delta is the loss modulus over the storage modulus. As seen in Table 3 and Table 4, compounds with higher values of tan delta at 0° C. indicate good traction capacity while a low tan delta value at 60° C. would indicate a tread compound with low rolling resistance.

The experimental tread compounds A and B in show the same minimization of tan delta in the 50°-60° C. region as does the experimental compound Y. This minimization was correlated with a low rolling resistance in compound Y. Similarly, compounds A and B show higher tan delta values in the region of −20° to 10° C. where compound Y showed higher tan delta values than the control. In compound Y, this higher tan delta in this region was associated with improved wet traction when used as a tread compound on a tire in Table 4.

The Detail Description specifies the design aspects of tire manufacture including reinforcing elements, curing components, processing aids, antidegradents, and fillers. It gives their approximate amount and representative examples of the compounds used. These are also applicable to the present embodiment of a tire tread compound.

While certain representative embodiments and details have been shown for the purpose of illustrating the invention, it will be apparent to those skilled in this art that various changes and modifications may be made therein without departing from the spirit or scope of the invention.

While in accordance with the Patent Statutes, the best mode and preferred embodiment has been set forth, the scope of the invention is not limited thereto, but rather by the scope of the attached claims.

What is claimed is:

1. A sulfur cured rubber composition comprising, based on 100 parts by weight rubber (phr);
   (A) 5 to about 35 parts by weight 1,3-polyisoprene rubber;
   (B) about 5 to about 50 parts by weight cis 1,4-polybutadiene having 95% or more cis 1,4 structure or at least 90% cis and trans 1,4 structure; and
   (C) about 20 to about 90 parts by weight terpolymer of styrene/isoprene/butadiene (SIBR);
   wherein said 3,4-polyisoprene rubber, in its uncured state, is characterized by having a glass transition temperature (Tg) in the range of about −15° C. to about −20° C., a Mooney (ML1+4) value in the range of about 70 to about 90, and a polymer structure containing about 40 to about 70 percent 3,4-vinyl isoprene units, about 28 to about 50 percent 1,4-cis and trans units and about 2 to about 10 percent 1,2-isoprene units with the total of its 3,4- and 1,2-units being in the range of about 56 to about 63 percent;
   wherein said SIBR is comprised of
      (a) about 5 to about 70 weight percent bound styrene;
      (b) about 20 to about 70 weight percent bound isoprene, and
      (c) about 10 to about 60 weight percent bound butadiene and is characterized by having a glass transition temperature (Tg) in the range of about −70° C. to about −5° C. and, further, the said bound butadiene structure contains about 10 to about 50 weight percent 1,2-vinyl units, the said bound isoprene structure contains about 10 to about 40 weight percent 3,4 units, and the sum of the weight percent 1,2-vinyl units of the bound butadiene and the weight percent 3,4 units of the bound isoprene is in the range of about 20 to about 90 percent.

2. The composition of claim 1, comprising a triblend of (A) about 5 to about 25 parts by weight of said 3,4-polyisopene; (B) about 10 to about 40 parts by weight of said cis 1,4 polybutadiene; (C) about 50 to about 80 parts by weight of said terpolymer of styrene/isoprene/butadiene.

3. The composition of claim 1, wherein said 3,4-polyisoprene rubber has a Mooney (ML1+4) value in the range of about 75 to about 85, and a polymer structure containing about 50 to 60 percent 3,4-isoprene units.

4. A pneumatic tire having an outer circumferential tread where said tread is the sulfur cured composition of claim 1.

5. A pneumatic tire having an outer circumferential tread where said tread is the sulfur cured composition of claim 2.

6. A sulfur cured rubber composition comprising;
   (A) 5 to about 35 parts by weight 3,4-polyisoprene rubber;
   (B) about 5 to about 50 parts by weight cis 1,4-polybutadiene having 95% or more cis 1,4 structure or at least 90% trans and cis 1,4 structure; and
   (C) about 20 to about 90 parts by weight terpolymer of styrene/isoprene/butadiene (SIBR);
   (D) about 0 to about 25 parts, based on 100 parts of (A, B, and C), of other diene based rubbers selected from cis 1,4-polyisoprene, solution polymerized poly(styrene-butadiene), solution polymerized medium vinyl polybutadiene and emulsion polymerized polybutandiene, based on 100 parts of A, B, and C;

wherein said 3,4-polyisoprene rubber, in its uncured state, is characterized by having a glass transition temperature (Tg) in the range of about −15° C. to about −20° C., a Mooney (ML1+4) value in the range of about 70 to about 90, and, further, a polymer structure containing about 40 to about 70 percent 3,4-vinyl isoprene units, about 28 to about 50 percent 1,4-cis and trans units and about 2 to about 10 percent 1,2-isoprene units with the total of its 3,4- and 1,2-units being in the range of about 56 to about 63 percent;

wherein said SIBR is comprised of
  (a) about 5 to about 70 weight percent bound styrene,
  (b) about 20 to about 70 weight percent bound isoprene, and
  (c) about 10 to about 60 weight percent bound butadiene and is characterized by having a glass transition temperature (Tg) in the range of about −70° C. to about −5° C. and, further, the said bound butadiene structure contains about 10 to about 50 weight percent 1,2-vinyl units, the said bound isoprene structure contains about 10 to about 40 weight percent 3,4 units, and the sum of the weight percent 1,2-vinyl units of the bound butadiene and the weight percent 3,4 units of the bound isoprene is in the range of about 20 to about 90 percent.

7. The composition of claim 6, comprising a blend of (A) 5 to about 25 parts by weight of said 3,4-polyisoprene; (B) about 20 to about 40 parts by weight of said cis 1,4 polyisobutadiene; (C) about 35 to about 65 parts by weight of said terpolymer of styrene/isoprene/butadiene; and (D) about 0 to about 25 parts of other diene based rubbers selected from cis 1,4-polyisoprene, solution polymerized poly(styrenebutadiene), emulsion polymerized poly(styrene-butadiene), solution polymerized medium vinyl polybutadiene, and emulsion polymerized polybutadiene.

8. The composition of claim 7, wherein said 3,4-polyisoprene rubber has a Mooney (ML1+4) value in the range of about 75 to about 85 and a polymer structure containing about 50 to about 60 percent 3,4-isoprene units.

9. A pneumatic tire having an outer circumferential tread where said tread is the sulfur cured composition of claim 7.

10. A pneumatic tire having an outer circumferential tread where said tread is the sulfur cured composition of claim 8.

11. The sulfur cured rubber composition of claim 1, wherein the cis 1,4 polybutadiene is 95% or more cis 1,4-structure and was prepared with Ziegler-type catalyst or it is at least 90% of combined cis and trans 1,4-structure and was prepared with alkyl lithium catalyst.

12. The sulfur cured rubber composition of claim 6, wherein the cis 1,4 polybutadiene is 95% or more cis 1,4-structure and was prepared with Ziegler-type catalyst or it is at least 90% of combined cis and trans 1,4-structure and was prepared with alkyl lithium catalyst.

* * * * *